Dec. 2, 1952

E. P. THIAS 2,620,378

FINE TUNER FOR TURRET TYPE TUNERS

Filed Nov. 29, 1949

EDWIN P. THIAS,
Inventor.

HUEBNER, BEEHLER, WORREL,
HERZIG & CALDWELL,
Attorneys.

By [signature]

Patented Dec. 2, 1952

2,620,378

UNITED STATES PATENT OFFICE 2,620,378

FINE TUNER FOR TURRET TYPE TUNERS

Edwin P. Thias, Los Angeles, Calif., assignor to Standard Coil Products Co., Inc., Chicago, Ill., a corporation of Illinois Application November 29, 1949, Serial No. 129,956

3 Claims. (Cl. 175—41.5)

My invention relates to a turret type tuner for radio and television apparatuses. It has particular reference to the physical structure of a variable capacitor for fine tuning within a selected frequency band.

Turret type tuner comprising generally a rotatably mounted drum having a plurality of panels mounted about the periphery thereof and carrying circuit components, each of which is adapted to make a radio circuit operative within a different frequency band, so that upon rotation of the turret various frequency bands may be selected.

It is necessary to provide some means for obtaining a fine adjustment of the impedance values of the selected circuit in order to have the circuit resonant at the desired frequency.

It is one of the objects of my invention to provide a simple inexpensive effective variable capacitor adapted for such fine tuning.

Turret type tuners are usually provided with a shaft extending outwardly therefrom, upon which a control knob is secured in order to operate the turret. It is one of the objects of my invention to provide a variable capacitor controllable by means of a hollow shaft concentric with and journaled on the control shaft of the turret.

This invention is concerned solely with the physical structure of such variable capacitor and the means for mounting such capacitor for use in connection with a turret tuner. The details of the turret tuner are not herein set forth in full. For further details of such a tuner, reference is made to the co-pending application of Edwin P. Thias and Warren W. White, Serial No. 40,394, filed July 23, 1948, now patent numbered 2,496,183.

Other and further objects and advantages will become apparent from the following descriptions and the drawings relative thereto.

Figure 1:
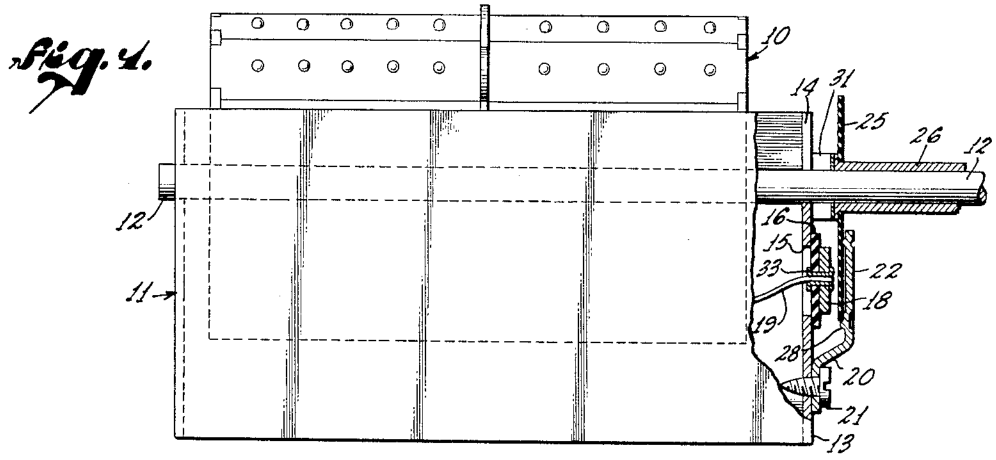
Figure 1 is a side elevation of a turret type tuner showing my variable capacitor in section.

For illustrative purposes, I have shown a turret type tuner having a turet designated generally 10, rotatably mounted in a box-like frame 11 by means of a shaft 12. The box-like frame 11 is formed with an end wall 13 having a slot 14 into which the shaft 12 is disposed.

The end wall 13 is formed with an aperture 15 over which dielectric plate 16 is disposed and secured to the end wall 13 by means of rivets 17.

A conductive plate 18 is mounted on the dielectric plate 16 over the aperture 15 and is connected to the electrical circuit of the tuner by a conductor 19.

I have illustrated the aperture 15 as being slightly larger than the conductive plate 18. It will be understood that this exact relation is not essential, but as will be understood from a further description, it is desirable in order to avoid a capacity effect between the conductive plate 18 and the end wall 13.

A ground plate 20 is secured to the end wall 13 by means of a screw 21 and has a portion thereof designated 22 extending in spaced paralleled relation with the conductive plate 18. A capacitor is thereby defined between the conductive plate 18 and the portion 22.

A dielectric plate 25 is secured to a hollow shaft 26 perpendicular to the axis thereof, which said hollow shaft is journaled on the shaft 12. The dielectric plate extends laterally between the conductive plate 18 and the ground plate portion 22. As will be seen in Figure 2, the dielectric plate 25 assumes the shape of a spiral whereby upon rotation thereof between the plates of the capacitor above defined, varying amounts of the dielectric plate 25 intrude between the two plates of the capacitor, in a straight line function relative to the rotation to thereby vary the capacity of the said capacitor.

Figure 2:
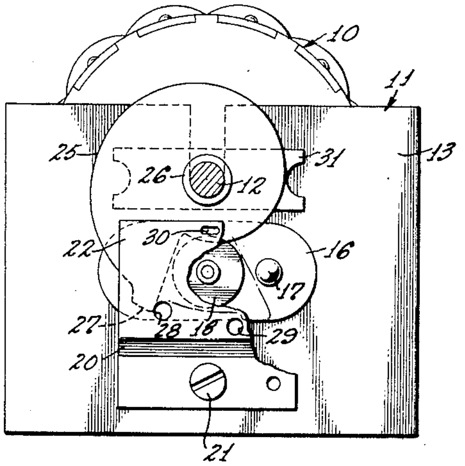
Figure 2 is an end view of the turret type tuner and variable capacitor shown in Figure 1.

It will be noted from Figure 2, that the dielectric plate 25 is formed with an outwardly projecting finger 27. It will also be noted that the ground plate 20 is formed with projections 28 and 29 which are adapted to engage the finger 27 upon rotation of the dielectric plate 25 to prevent complete rotation thereof and to stop the rotation at the maximum and minimum capacity values.

The upper end of the ground plate portion 22 is formed with an inwardly extending dimple 30, against which the dielectric plate 25 is resiliently urged by means of a leaf spring 31. The dimple 30 is sufficient in depth to cause the dielectric plate 25 to ride clear of the under-surface of the plate portion 22 to thereby maintain a substantially constant setting thereof and to minimize frictional drag thereon.

Figure 3:
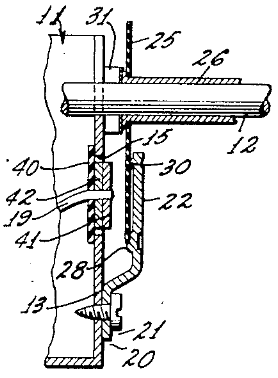
Figure 3 is a side sectional elevation of a modified form of my variable capacitor.

It will be noted that in Figures 1 and 2, the dielectric plate 16 is secured to the exterior surface of the end wall 13. Such construction is satisfactory in the event of a relatively low coefficient of thermal expansion of the material used. I have found that a steotite or other ceramic dielectric material used for the plate 16 having a silver surface in place of the conductive plate 18 is satisfactory in this type installation. I have found that in the event the dielectric 16 is formed of such material as Bakelite or Micarta having a metallic plate 18 secured to the surface thereof by means of a hollow rivet such as 33 that a thermal drift occurs in the value of the capacity of the capacitor. I have discovered that by mounting a dielectric plate on the interior surface of the end wall 13, that such thermal drift is minimized. Such modification is illustrated in Figure 3, wherein like numerals indicate like parts. In this modification, I have illustrated a dielectric plate 40 secured to the inner surface to the end wall 13 having a conductive plate 41 secured to said dielectric plate with a spacer 42 interposed therebetween to position the conductive plate 41 with respect to the end portion 22 of the grounding plate. In this modification, the aperture 15 must of necessity be large enough to permit the extension of the conductive plate 41 therethrough without interfering with the capacity of the capacitor.

It is readily apparent that the thermal expansion of the dielectric plate 41 in such structure is immaterial, in that the conductive plate 41 is secured to the stationary surface thereof and expansion of the dielectric plate will not affect this position.

Whereas I have explained my invention in its most preferred forms, it would be apparent that modifications and other details of construction may be embodied therein without departing from the spirit of my invention, and that the invention is not limited to the details described, but should be accorded the full scope of equivalents within the scope of the claims hereinafter appended.

I claim:

1. In a turret type tuning unit, a box-like frame, a shaft extending from one end of said frame for operating said turret, and a variable capacitor comprising a conductive surface insulatedly mounted on said end of said frame remote from said shaft, a conductive plate secured to said end of said frame having a portion extending in spaced parallel relation to said conductive surface to thereby define two plates of a capacitor, said parallel conductive plate comprising a dimple, a hollow shaft rotatably journaled on said first shaft having a dielectric tuning plate secured thereto perpendicular to the axis thereof and extending outwardly for rotary movement between said capacitor plates, said dielectric plate having a spiral configuration whereby upon rotation around said first shaft to vary the capacity of said capacitor, said conductive surface and said conductive plate being mounted independently of said first and second shafts, and resilient means for urging said dielectric plate into frictional engagement with said dimple of said parallel plate, said parallel plate portion being formed with integral stop means for engaging an extending finger formed on said dielectric plate to prevent complete rotation thereof.

2. In a turret type tuning unit, a box-like frame, a shaft extending from one end of said frame for operating said turret, and a variable capacitor comprising a conductive surface insulatedly mounted on the outside surface of said end of said frame remote from said shaft, a conductive grounding plate secured to said end of said frame having a portion extending in spaced parallel relation to said conductive surface to thereby define two plates of a capacitor, said parallel conductive plate comprising a dimple, a hollow shaft rotatably journaled on said first shaft having a dielectric tuning plate secured thereto perpendicular to the axis thereof and extending outwardly for rotary movement between said capacitor plates, said dielectric plate having a spiral configuration of approximately 360 degrees whereby upon rotation around said first shaft to vary the capacity of said capacitor, said conductive surface and said conductive plate being mounted independently of said first and second shafts, and resilient means for urging said dielectric plate into frictional engagement with said dimple of said parallel plate, said parallel plate portion being formed with integral stop means for engaging an extending finger formed on said dielectric plate to prevent complete rotation thereof.

3. In a turret type tuning unit, a box-like frame, a shaft extending from one end of said frame for operating said turret, and a variable capacitor comprising a conductive surface insulatedly mounted on the inside surface of said end of said frame substantially adjacent said shaft and extending through an aperture therein, a conductive plate secured to said end of said frame having a portion extending in spaced parallel relation to said conductive surface to thereby define two plates of a capacitor, a hollow shaft rotatably journaled on said first shaft having a dielectric tuning plate secured thereto perpendicular to the axis thereof and extending outwardly for rotary movement between said capacitor plates, said dielectric plate having a spiral configuration whereby upon rotation around said first shaft to vary the capacity of said capacitor, and resilient means for urging said dielectric plate into frictional engagement with said parallel plate portion, said parallel plate portion being formed with integral stop means for engaging an extending finger formed on said dielectric plate to prevent complete rotation thereof.

EDWIN P. THIAS.

REFERENCES CITED

The following references are of record in the file of this patent:

UNITED STATES PATENTS

| Number | Name | Date |
|---|---|---|
| 1,589,008 | Kirby | June 15, 1926 |
| 1,608,526 | Potter | Nov. 30, 1926 |
| 1,759,564 | Bennett | May 20, 1930 |
| 2,395,520 | Toth | Feb. 26, 1946 |
| 2,488,791 | Zaat | Nov. 22, 1949 |